US009387426B2

(12) United States Patent
Bryant et al.

(10) Patent No.: US 9,387,426 B2
(45) Date of Patent: Jul. 12, 2016

(54) SYSTEMS AND METHODS FOR MANAGING TURBINE INTAKE FILTERS

(71) Applicant: BHA Altair, LLC, Franklin, TN (US)

(72) Inventors: Paul Sherwood Bryant, Alton (GB); Steve Hiner, Alton (GB)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 14/082,995

(22) Filed: Nov. 18, 2013

(65) Prior Publication Data
US 2015/0135948 A1 May 21, 2015

(51) Int. Cl.
*B01D 46/00* (2006.01)
*F02C 7/05* (2006.01)
*B01D 46/44* (2006.01)
*F01D 21/10* (2006.01)
*F01D 21/14* (2006.01)
*F02C 7/052* (2006.01)

(52) U.S. Cl.
CPC .......... *B01D 46/444* (2013.01); *B01D 46/0068* (2013.01); *B01D 46/0086* (2013.01); *F01D 21/10* (2013.01); *F01D 21/14* (2013.01); *F02C 7/052* (2013.01); *B01D 2279/60* (2013.01)

(58) Field of Classification Search
CPC .......... B01D 46/0068; B01D 46/0079; B01D 46/008; B01D 46/0086; B01D 2279/60; B01D 46/44; B01D 46/444; B01D 46/446; F02C 7/05; F02C 7/052; F02C 7/055; F02C 7/057
USPC .......................................................... 96/417
See application file for complete search history.

(56) References Cited

U.S. PATENT DOCUMENTS

| 5,674,381 | A | * | 10/1997 | Den Dekker | 210/85 |
|---|---|---|---|---|---|
| 7,481,917 | B2 | | 1/2009 | Ikeyama et al. | |
| 7,736,495 | B2 | | 6/2010 | Ikeyama et al. | |
| 8,747,533 | B1 | * | 6/2014 | Ekanayake et al. | 96/417 |
| 2008/0087588 | A1 | * | 4/2008 | Grzonka et al. | 210/91 |
| 2008/0229927 | A1 | * | 9/2008 | Singh et al. | 95/281 |
| 2008/0296208 | A1 | | 12/2008 | Ikeyama et al. | |
| 2009/0045106 | A1 | | 2/2009 | Kuennen et al. | |
| 2010/0071616 | A1 | * | 3/2010 | Mauchle et al. | 118/308 |
| 2010/0075111 | A1 | | 3/2010 | Arrell et al. | |
| 2011/0061527 | A1 | * | 3/2011 | Sullivan | 95/1 |
| 2011/0083419 | A1 | | 4/2011 | Upadhyay et al. | |
| 2011/0185895 | A1 | * | 8/2011 | Freen | 95/25 |

(Continued)

FOREIGN PATENT DOCUMENTS

| EP | 1923651 A1 | 5/2008 |
|---|---|---|
| JP | 62101843 A | 5/1987 |
| JP | 07208206 A | 8/1995 |
| JP | 2008019801 A | 1/2008 |

*Primary Examiner* — Robert Clemente
(74) *Attorney, Agent, or Firm* — Reinhart Boerner Van Deuren P.C.

(57) ABSTRACT

Certain embodiments herein relate to systems and methods for managing turbine intake filters. In one embodiment, a system can include at least one memory configured to store computer-executable instructions and at least one controller configured to access the at least one memory and execute the computer-executable instructions. The instructions may be configured to monitor an indication associated with air flow through at least one filter of a turbine intake system. The instructions may be further configured to facilitate in the execution of at least management task of the turbine intake system, based at least in part on the indication of air flow through the filter.

14 Claims, 3 Drawing Sheets

(56) References Cited

U.S. PATENT DOCUMENTS

| | | |
|---|---|---|
| 2013/0048550 A1 | 2/2013 | Miles et al. |
| 2014/0123853 A1* | 5/2014 | Desai et al. ............ 95/280 |
| 2014/0237763 A1* | 8/2014 | Holsten et al. ............ 15/352 |
| 2014/0251129 A1* | 9/2014 | Upadhyay et al. ............ 95/19 |
| 2014/0283682 A1* | 9/2014 | Hamann et al. ............ 95/10 |

* cited by examiner

SYSTEMS AND METHODS FOR MANAGING TURBINE INTAKE FILTERS

FIELD OF THE DISCLOSURE

Embodiments of the disclosure generally relate to managing turbine intake filters and, more particularly, to systems and methods for managing turbine intake filters.

BACKGROUND

Air entering gas turbine intakes pass through filters which remove impurities from the air. Over time, dirt and dust accumulate on the filters and degrade their performance. Some filters must be purged regularly to optimize their ability to clean the incoming air. Also, the age of a filter may contribute to diminished performance. Cleaning or purging strategies exist for removing built up dust and dirt from filters, but many air intake systems include filters of different ages and with different amounts of buildup. In some instances, a customized cleaning mechanism can be employed that accounts for the particular condition of the filter. However, conventional systems for cleaning filters may not account for the heterogeneous combination of various filter conditions, using instead, a single cleaning approach for all filters. This type of approach can be both too weak to clean certain filters and too strong—and, therefore, potentially damaging—for cleaning other filters of the same system.

BRIEF SUMMARY OF THE DISCLOSURE

Some or all of the above needs and/or problems may be addressed by certain embodiments of the disclosure. Certain embodiments may include systems and methods for managing turbine intake filters. According to one embodiment of the disclosure, there is disclosed a system. The system may include at least one filter associated with at least one turbine intake. The system may also include a device associated with the at least one filter that is operable to provide an indication based at least in part on air flow through the filter. The indication may be detected and received by a device of the system.

According to another embodiment of the disclosure, there is disclosed a method. The method may include filtering at least one turbine intake with at least one filter. The method can also include generating, by a device associated with the at least one filter, an indication based at least in part on air flow through the at least one filter. Furthermore, the method can include monitoring, by at least one monitoring device associated with the at least one filter, the indication.

According to another embodiment of the disclosure, there is disclosed a system. The system may include at least one memory configured to store computer-executable instructions and at least one controller configured to access the at least one memory and execute the computer-executable instructions. The instructions may be configured to monitor an indication, the indication based at least in part on air flow through at least one turbine intake filter. The instructions may be further operable to facilitate in the execution of at least one management task of the turbine intake based at least in part on the indication of the air flow.

Other embodiments, systems, methods, aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so this disclosure will satisfy applicable legal requirements.

Certain embodiments disclosed herein relate to managing turbine intake filters. Accordingly, a system can be provided to manage turbine intake filters. For example, an intake may be filtered with at least one filter. There may be a device associated with the filter, the device operable to generate an indication based at least in part on air flow through the filter. The indication may be detected or received by a monitoring device. One or more technical effects associated with certain embodiments herein may include, but are not limited to, identification of filter performance in a turbine intake system, and facilitation of execution of management tasks based at least in part on the indication. Furthermore, one or more technical effects associated with certain embodiments can include increasing the operational life of individual filters and increasing performance of filter cleaning and replacement.

Figure 1:
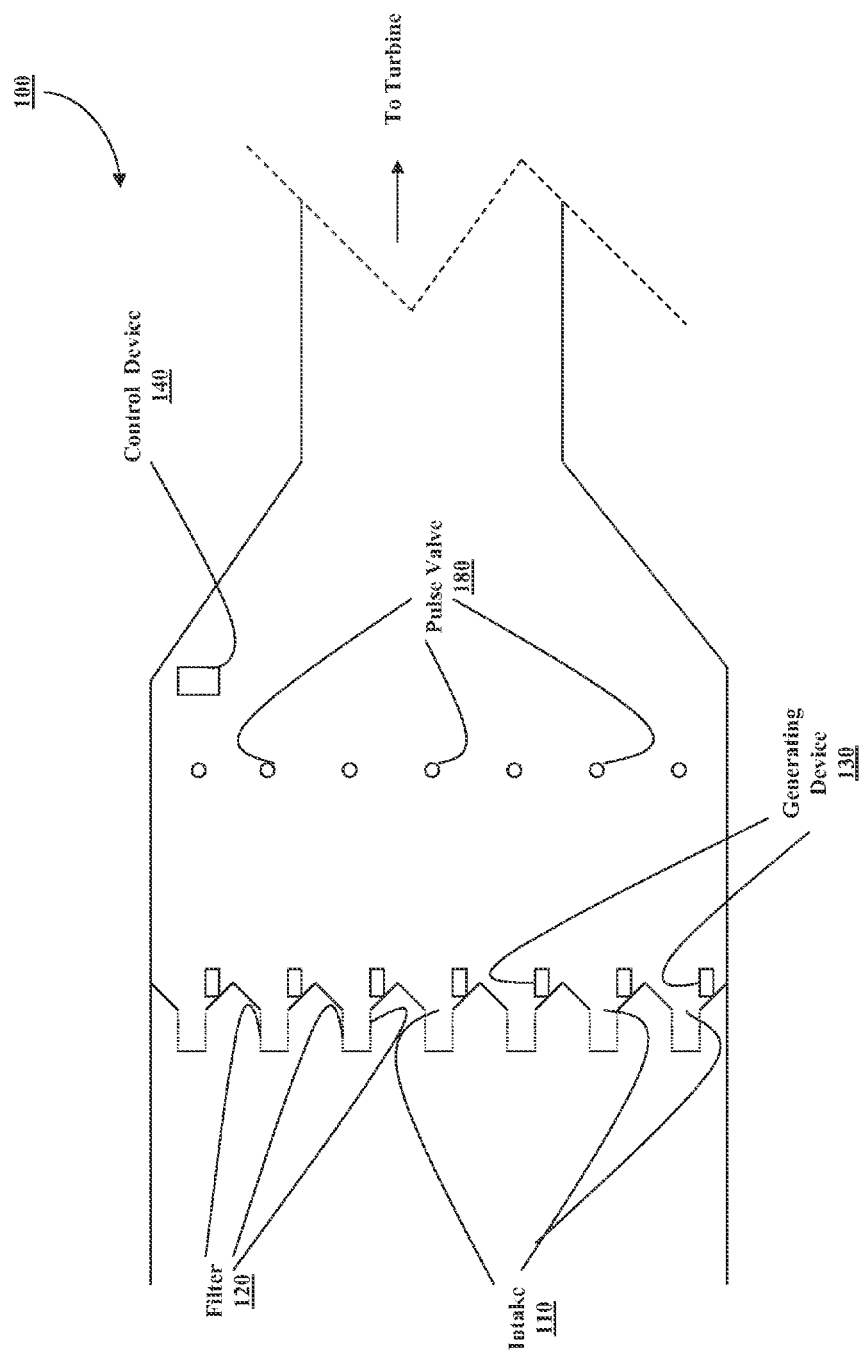
FIG. 1 illustrates an example system for managing turbine intake filters, according to an embodiment of the disclosure.

FIG. 1 depicts an example system 100 that facilitates managing turbine intake filters. According to an embodiment of the disclosure, the system 100 may include at least one intake 110 through which air may pass into a turbine. Each intake 110 may be associated with at least one filter 120. Each filter 120 may be associated with a respective generating device 130, and the respective generating device 130 may be operable to generate an indication based at least in part on air flow through the at least one filter 120. At least one control device 140 may be operable to detect or receive the indication from one or more generating devices 130.

With continued reference to FIG. 1, in one embodiment of the disclosure, the system 100 may further include execution of a management task associated with the at least one intake 110 and/or the at least one filter 120. The management task may include replacing the at least one filter 120, and/or pulsing the at least one filter 120 facilitated at least in part by at least one pulse valve 180. The management task may be based at least in part on the indication, and the management task may further include any other task suitable for managing filters in a turbine intake system, such as the system 100 of FIG. 1. Pulsing the at least one filter 120 may include cleaning the filter 120 and/or causing air to flow through the filter 120, for example, causing air to flow through the filter 120 in the opposite direction of air entering the intake 110. In one embodiment, the at least one pulse valve 180 may perform based at least in part on a command from at least one control device 140. The at least one control device 140 may command the at least one pulse valve 180 based at least in part on the indication detected or received from a respective generating device 130.

When air passes through at least one filter 120, the respective generating device 130 may generate an indication based at least in part on the air flow. The indication may include an assessment of the air flow and the indication may include a real-time translation of the air flow. The indication may include an acoustic indication and/or a vibrational indication. In a further embodiment, the indication may be compared with an initial or default indication which may represent an initial or default condition of the at least one filter 120. The respective generating device 130 may include a reed, wind chimes, a vibrating drum skin, a perforated plate, and other similar mechanisms for indicating an assessment of air flow. The respective generating device 130 may be in proximity with at least one filter 120, wherein there may be at least one generating device 130 associated with each filter 120. In a further embodiment, the at least one control device 140 may include a microphone operable to detect and receive the indication. The at least one filter 120 may be operable to clean and/or remove impurities from air passing through the filter 120. There may be many filters 120 in a single turbine intake system 100 and each filter 120 may have a unique cleaning performance and may have a unique amount of buildup accumulated. In one embodiment, based at least in part on the particular condition of the at least one filter 120, the respective generating device 130 may generate a particular indication. The at least one control device 140 may cause the at least one pulse valve 180 to pulse the at least one filter 120 based at least in part on the indication. In one embodiment, different filters 120 may require different pulsing parameters. An indication about the condition of each filter 120 may be generated by the respective generating device 130 and may be used, at least in part, by the at least one control device 140 to cause the at least one pulse valve 180 to pulse the at least one filter 120.

With continued reference to FIG. 1, in one embodiment of the disclosure, the at least one control device 140 may be further operable to determine a variance of the air flow. In a further embodiment, the determination may include a predefined threshold associated with the at least one filter 120. The at least one control device 140 may be further operable to detect or receive more than one indications from respective generating devices 130. The at least one control device 140 may be further operable to direct the at least one pulse valve 180, including to pulse the at least one filter 120. In a further embodiment, the at least one control device 140 may be operable to direct more than one pulse valve 180.

As desired, embodiments of the disclosure may include a system 100 with more or fewer components than are illustrated in FIG. 1. Additionally, certain components of the system 100 may be combined in various embodiments of the disclosure. The system 100 of FIG. 1 is provided by way of example only.

Figure 2:
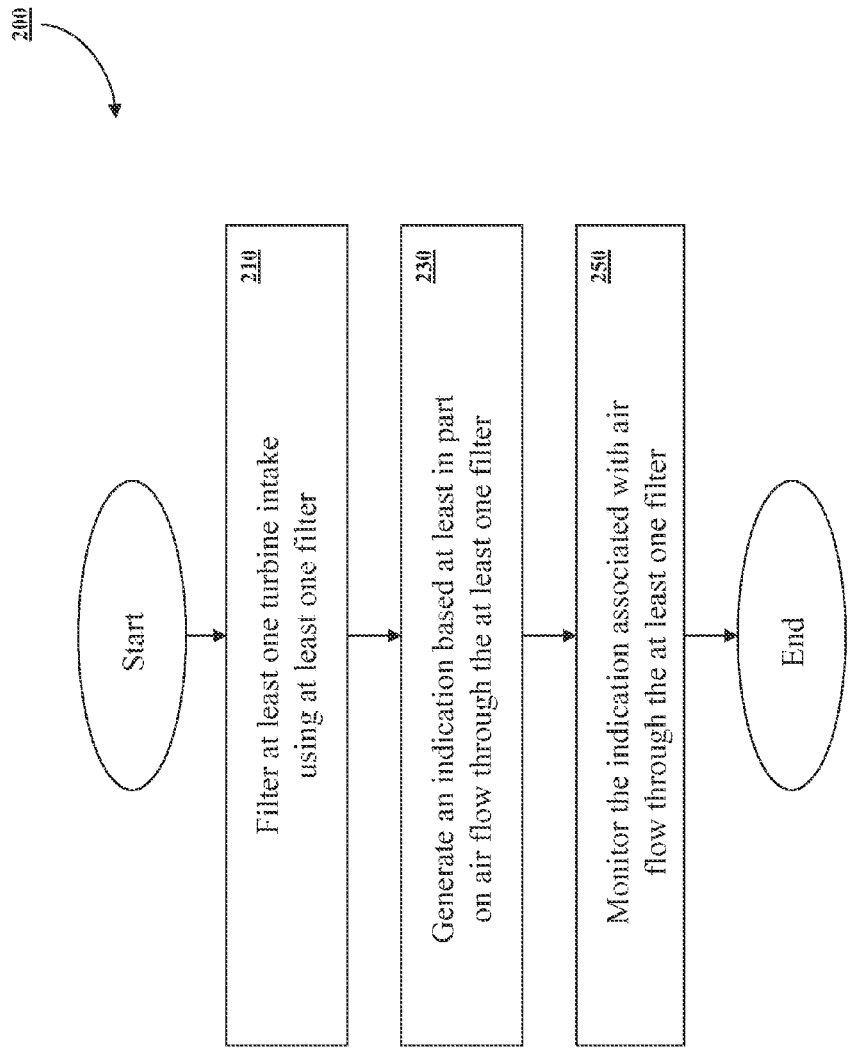
FIG. 2 is a flow diagram of an example method for managing turbine intake filters based at least in part on generating an indication of air flow through a filter.

Referring now to FIG. 2, shown is a flow diagram of an example method 200 for managing turbine intake filters, according to an illustrative embodiment of the disclosure. The method 200 may be utilized in association with various systems, such as the system 100 illustrated in FIG. 1.

The method 200 may begin at block 210. At block 210, at least one filter, such as filter 120, may be associated with at least one intake, such as intake 110. The filter may be of varying type and size, and with varying filtration performance characteristics, and may be operable to clean and/or remove impurities from air flowing through the intake. There may be amore than one filter associated with an intake and more than one filter associated with more than one intakes. Each filter may further be associated with a respective generating device.

Next, at block 230, an indication based at least in part on air flow through the at least one filter may be generated by a respective generating device, such as the generating device 130 of FIG. 1. The indication may include an indication of a particular condition of the at least one filter, for example, an indication of the amount of dirt or dust buildup on the filter. In a further embodiment, the indication may be compared with an initial or default indication which may represent an initial or default condition of the at least one filter. The respective generating device may include any reasonable means of indicating an air flow or an air flow assessment, such as, via wind chimes, a vibrating drum skin, a reed, and a perforated plate, for example.

Next, at block 250, the method 200 can includes monitoring the indication from the generating device associated with the at least one filter. The indication may be detected and received by a control device, such as at least one control device 140 of FIG. 1. In one embodiment, the at least one control device may include a microphone operable to detect and receive the indication. Depending on the composition of the indication, the respective generating device may indicate a particular condition of the at least one filter, for example, the buildup of dust and dirt on the filter. Monitoring the indication may include detection of the indication composition, including a determination of the particular filter condition. The control device may be further operable to detect and receive indications from one or more generating devices, including indications associated with one or more filters, and indications associated with one or more turbine intake systems.

The method 200 of FIG. 2 may optionally end following block 250.

The operations described and shown in the method 200 of FIG. 2 may be carried out or performed in any suitable order as desired in various embodiments of the disclosure, and the method 200 may repeat any number of times. Additionally, in certain embodiments, at least a portion of the operations may be carried out in parallel. Furthermore, in certain embodiments, fewer than or more than the operations described in FIG. 2 may be performed.

Figure 3:
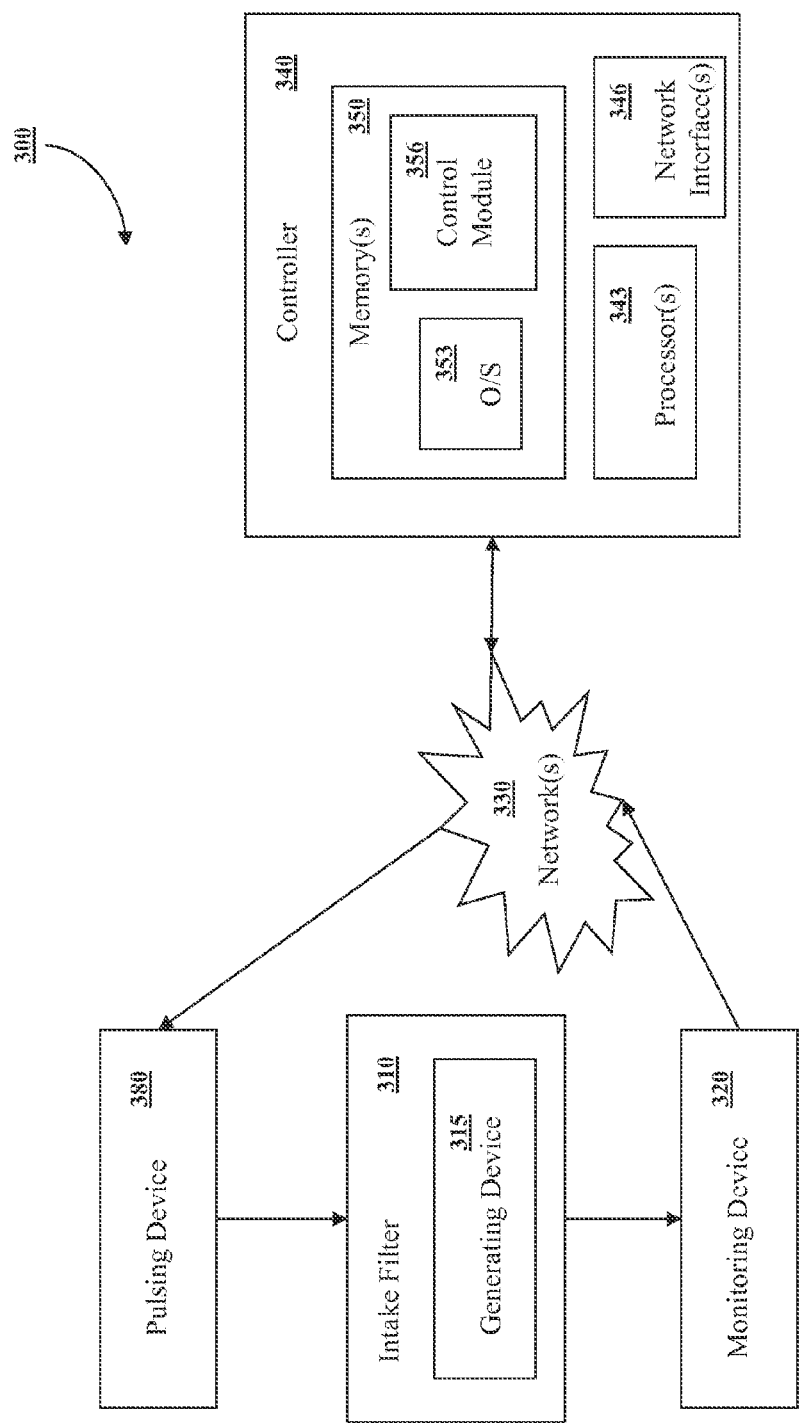
FIG. 3 illustrates an example functional block diagram representing an example intake filter management system, according to an embodiment of the disclosure.

Referring now to FIG. 3, a block diagram is depicted in one example system 300 operable to facilitate management of turbine intake filters. According to an embodiment of the disclosure, the system 300 may include a control module 356 associated with a controller 340. The control module 356 may be configured to monitor an indication associated with at least one intake filter 310 of a turbine intake system, like the system 100 of FIG. 1. In some embodiments of the system 300, a generating device 315 may be associated with the intake filter 310. The generating device 315 may be operable to generate an indication associated with the condition of the filter 310, based at least in part on air flow through the filter 310. In one embodiment, the indication may include an acoustic signal and/or a vibrational signal, for example. The control module 356 may be operable to detect and receive the indication. The indication may include an assessment of the air flow through the filter 310 and it may include a real-time representation of the air flow. In a further embodiment, the control module 356 may be operable to compare the indication with a history of indications associated with the at least one intake filter 310, with an indication detected or received soon after a pulsing of the at least one intake filter 310, as well as with indications associated with the at least one filter 310 which are detected or received by other monitoring devices 320 that may be associated with the same at least one filter 310. The control module 356 may be further operable to identify a condition of the intake filter 310 based at least in part on the detected or received indication. The control module 356 may further be operable to facilitate the execution of a management task, based at least in part on the indication. In some embodiments, the management task may include manipulation of at least one pulsing device 380 operable to pulse the at least one intake filter 310, and replacement of the at least one intake filter 310, among other categories of managements tasks.

The controller 340 may include any number of suitable computer processing components that may, among other things, facilitate the management of turbine intake filters. Examples of suitable processing devices that may be incorporated into the controller 340 include, but are not limited to, personal computers, tablet computers, wearable computers, personal digital assistants, mobile phones, application-specific circuits, microcontrollers, minicomputers, other computing devices, and the like. As such, the controller 340 may include any number of processors 343 that facilitate the execution of computer-readable instructions. By executing computer-readable instructions, the controller 340 may include or form a special purpose computer or particular machine that facilitates processing of intake filter management.

In addition to one or more processors 343, the controller 340 may include one or more memory devices 350, and/or one or more communications and/or network interfaces 346. The one or more memories 350 may include any suitable memory devices, for example, caches, read-only memory devices, random access memory devices, magnetic storage devices, etc. The one or more memories 350 may store filter and pulsing data, executable instructions, and/or various program modules utilized by the controller 340, for example, at least one control module 356 and an operating system ("O/S") 353. The one or more memories 350 may include any suitable data and applications that facilitate the operation of the controller 340 including, but not limited to, for communication between the controller 340, network 330, pulsing device 380, monitoring device 320, and the at least one intake filter 310. In certain embodiments, the one or more memories 350 may be further operable to store indications and/or pulse valve information associated with at least one intake filter 310. The O/S 353 may include executable instructions and/or program modules that facilitate and/or control the general operation of the controller 340.

Additionally, the O/S 353 may facilitate the execution of other software programs and/or program modules by the processor(s) 343, such as, the control module 356. The control module 356 may be a suitable software module with corresponding hardware capability configured to allow communication with objects outside the controller 340. The control module 356 may include one or more programming modules to facilitate management of turbine intake filters. For example, the control module 356 may communicate with the monitoring device 320 and pulsing device 380 via network interface 346 and network 330. The control module 356 may be further operable to facilitate manipulation of the pulsing device 380 based at least in part on the indication generated by generating device 315 and detected or received by monitoring device 320. The control module 356 may provide pulsing parameters particular to the at least one intake filter 310 based at least in part on the indication associated with the at least one intake filter 310. The pulsing device 380 may be associated with at least one intake filter 310 and may pulse the filter 310 by cleaning or by causing air to travel through the filter 310, for example, by causing air to travel through the filter 310 in the opposite direction of the intake air. The pulsing device 380 may use varying types, strengths, and amounts of pulses for an intake filter 310, according to a filter condition, for example, an amount of buildup of dust and dirt on the filter 310. The control module 356 may therefore customize manipulation of the pulsing device 380 particular to a particular condition of intake filter 310 such as filter cleanliness. The control module 356 may be further operable to facilitate the manipulation of a plurality of pulsing devices 380 based at least in part on detecting and receiving indications associated with an individual intake filter 310 and/or associated with a group of filters.

As desired, embodiments of the disclosure may include a system 300 with more or fewer components than are illustrated in FIG. 3. Additionally, certain components of the system 300 may be combined in various embodiments of the disclosure. The system 300 of FIG. 3 is provided by way of example only.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

The invention claimed is:

1. A system of managing turbine intake filters, the system comprising:
an intake arrangement including a plurality of filters. each one of the plurality of filters defining a clean fluid side, the clean fluid side of the plurality of filters in fluid communication with one another;
a plurality of devices, each device being associated with a corresponding one of the plurality of filters, the device being on the clean fluid side of the corresponding one of the plurality of filters, the device providing an indication based at least in part on a velocity of air flow through the corresponding one of the plurality of filters on the clean fluid side relating to a status of the corresponding one of the plurality of filters; and
at least one control device operable to detect or receive the indications from each the plurality of devices.

2. The system of claim 1, further including a plurality of pulse valves wherein at least one of the plurality of pulse valves may be manipulated based at least in part on detection or receipt of the indication of one of the devices.

3. The system of claim 1, wherein the indication comprises at least one of (i) an acoustic signal or (ii) a vibrational signal.

4. The system of claim 1, wherein the at least one control device is further operable to detect or receive a plurality of indications from the devices.

5. The system of claim 1, wherein the at least one control device is further operable to determine a variance of the velocity of air flow based at least in part on the detected or received indication and a predefined threshold associated with each one of the plurality of filters.

6. The system of claim 5, wherein the at least one control device is further operable to signal replacement of an individual one of the plurality of filters based at least in part upon the determined variance of the velocity of air flow through the individual one of the plurality of filters and the predefined threshold associated with the individual one of the plurality of filters.

7. The system of claim 2, wherein the at least one control device is further operable to manipulate at least one of the plurality of pulse valves.

8. The system of claim 1, wherein the at least one control device is operable to signal replacement of an individual one of the plurality of filters based on the indication from the device associated with the individual one of the plurality of filters.

9. A method of managing turbine intake filters, the method comprising:
filtering at least one turbine intake using a plurality of filters, each one of the plurality of filters defining a clean fluid side, the clean fluid side of the plurality of filters in fluid communication with one another, the plurality of filters having a plurality of devices associated therewith, each device being associated with a corresponding one of the plurality of filters;
generating, by each device, an indication based at least in part on a velocity of air flow through the corresponding one of the plurality of filters on the clean fluid side relating to a status of the corresponding one of the plurality of filters
monitoring, by at least one monitoring device associated with the plurality of filters, the indications of each one of the devices.

10. The method of claim 9, further comprising pulsing at least one of the plurality of filters based at least in part on the indication of the device corresponding to the at least one of the plurality of filters.

11. The method of claim 9, wherein generating the indication further comprises at least one of generating (i) an acoustic signal or (ii) a vibrational signal.

12. The method of claim 9, wherein the at least one monitoring device is further operable to monitor indications from the devices.

13. The method of claim 9, further comprising determining a variance of the velocity of the air flow based at least in part on the detected or received indication and a predefined threshold associated with each one of plurality of filters.

14. The method of claim 10, wherein the at least one monitoring device is further operable to direct the pulsing of at least one of the plurality of pulse valves.

* * * * *